United States Patent
Hawkins et al.

[11] Patent Number: 6,055,003
[45] Date of Patent: Apr. 25, 2000

[54] CONTINUOUS TONE MICROFLUIDIC PRINTING

[75] Inventors: Gilbert A. Hawkins, Mendon; Omid A. Moghadam, Rochester, both of N.Y.

[73] Assignee: Eastman Kodak Company, Rochester, N.Y.

[21] Appl. No.: 08/901,654

[22] Filed: Jul. 28, 1997

[51] Int. Cl.[7] .............................. B41J 2/165; B41J 13/02
[52] U.S. Cl. .................. 346/140.1; 346/22; 346/134; 346/136; 347/6; 347/22; 347/28
[58] Field of Search .................... 346/140.1, 22, 346/134, 136; 347/22, 28, 6

[56] References Cited

U.S. PATENT DOCUMENTS

| | | | |
|---|---|---|---|
| 5,248,996 | 9/1993 | Kato et al. | 346/134 |
| 5,771,810 | 6/1998 | Wolcott | 347/43 |
| 5,793,389 | 8/1998 | Mitchell | 347/28 |

*Primary Examiner*—N. Le
*Assistant Examiner*—Lamson D. Nguyen
*Attorney, Agent, or Firm*—Raymond L. Owens

[57] ABSTRACT

Apparatus for separating a receiver from a micro-fluidic contact print head after ink image pixels have been printed by the print head on the receiver, including a print head having a plurality of ink channels for delivering ink to the receiver when the receiver is in ink transfer contact with the print head; air plenums which are associated with each ink channel and a member defining an air channel for conducting air to the air plenum; and the apparatus is effective after the ink has been transferred from the plurality of ink channels to the receiver for causing air to be delivered from the air channel into the air plenum to exert a pressure which causes the separation of the receiver from the print head.

2 Claims, 9 Drawing Sheets

CONTINUOUS TONE MICROFLUIDIC PRINTING

CROSS REFERENCE TO RELATED APPLICATIONS

Reference is made to commonly assigned U.S. patent application Ser. No. 08/699,955 filed Aug. 20, 1996 entitled "Cyan and Magenta Pigment Set"; U.S. patent application Ser. No. 08/699,962 filed Aug. 20, 1996 entitled "Magenta Ink Jet Pigment Set"; U.S. patent application Ser. No. 08/699,963 filed Aug. 20, 1996 entitled "Cyan Ink Jet Pigment Set", all by McInerney, Oldfield, Bugner, Bermel, and Santilli; U.S. patent application Ser. No. 08/790,131 filed Jan. 29, 1997 entitled "Heat Transferring Inkjet Ink Images" by Bishop, Simons, and Brick; U. S. patent application Ser. No. 08/764,379 filed Dec. 13, 1996 entitled "Pigmented Inkjet Inks Containing Phosphated Ester Derivatives" by Martin; U.S. patent application Ser. No. 08/868,104 filed Jun. 3, 1997 entitled "Image Producing Apparatus For Microfluidic Printing" by Xin Wen, and U.S. patent application Ser. No. 08/901,181 filed concurrently herewith entitled "Microfluidic Printing with Optical Density Control" by Gilbert A. Hawkins et al, assigned to the assignee of the present invention. The disclosure of these related applications are incorporated herein by reference.

FIELD OF THE INVENTION

The present invention relates to microfluidic printing of colored pixels on a receiver.

BACKGROUND OF THE INVENTION

Microfluidic pumping and dispensing of liquid chemical reagents is the subject of three U.S. Pat. Nos. 5,585,069; 5,593,838; and 5,603,351. The system uses an array of micron sized reservoirs, with connecting microchannels and reaction cells etched into a substrate. Micro pumps include electrically activated electrodes within the capillary microchannels provide the propulsive forces to move the liquid reagents within the system. The micro pump, which is also known as an electroosmotic pump, has been disclosed by Dasgupta et al., see "Electroosmosis: A Reliable Fluid Propulsion System for Flow Injection Analyses", Anal. Chem. 66, pp. 1792–1798 (1994). The chemical reagent solutions are pumped from a reservoir, mixed in controlled amounts, and then pumped into a bottom array of reaction cells. The array could be decoupled from the assembly and removed for incubation or analysis. When used as a printing device, the chemical reagent solutions are replaced by inks including cyan, magenta, and yellow dyes or of dispersions of cyan, magenta, and yellow pigments, and the array of reaction cells could be considered a viewable display of picture elements, or pixels, comprising dyes, pigments, or mixtures of dyes or pigments having the hue of the pixel in the original scene. When contacted with paper, the capillary force of the receiver fibers pulls the dye from the cells and holds it in the receiver, thus producing a hard copy print, or reproduction, of the original scene.

Such a device includes a contact array print head. One way to render accurate tone scale would be to stock and pump a number of inks of different colors ranging from very light to dark. Another way to solve the tone scale problem is to print a very small dot of a particular color ink and leave white paper surrounding the dot. The human visual system will integrate the white and the small dot of dark color leading to an impression of light yellow, provided the dot is small enough. This is the principle upon which the art of color halftone lithographic printing rests. It is sometimes referred to as area modulation of tone scale. However, in order to provide a full tone scale of colors, a high resolution printer is required, with many more dots per inch.

Another way to render accurate tone scale for ink jet printers is described in U.S. Pat. No. 5,606,351 by Gilbert A. Hawkins, the disclosure of which is hereby incorporated by reference. U.S. Pat. No. 5,606,351 overcomes the above described problem by premixing the colored ink with a colorless ink in the correct proportions to produce a drop of ink of the correct intensity to render tone scale.

An alternate method has been proposed to render accurate tone scale by precisely timing the duration of contact of the ink with the receiver at each image pixel. In accordance, ink in each ink channel is brought into contact with the receiver by a micro pump located in the ink channel. The practice requires that termination of the printing of ink image pixels be precisely timed, since the ratio of printing time of one ink image pixel, during which ink from a corresponding ink channel is in contact with the receiver, to the printing time of other ink image pixels determines the fidelity of reproduction of the grayscale levels. Control of grayscale levels is well known in the art of image science to play an important role in image quality. Precise timing in turn requires that contact between the ink and the receiver be terminated precisely, which is difficult because of the tendency of the ink to remain in contact with the receiver due to the surface energy of the ink and receiver interface and to the cohesive energy of the ink, as is well known in the art of fluid dynamics.

One way of terminating contact of the ink with the receiver involves stopping or reversing the action of the pumps controlling the ink in each ink channel. This method is difficult and expensive and may result in imprecise timing because breaking contact between the body of ink in the microchannel and the ink contacting the receiver requires a very strong pump. Also, the exact location of the break point is uncertain if the ink channel is uniform. In addition, since the surface of the receiver is generally hydrophobic in order that it imbibe ink, prolonged time may be required to separate the ink in the body of the ink in the microchannel from that contacting the receiver. Also, it is difficult to turn off or on a plurality of micro pumps simultaneously due to the constraints of data handling and power consumption.

Another way of terminating contact of the ink with the receiver involves physically lifting the receiver from the substrate top surface, preferably rapidly, so that contact between the ink and receiver is broken simultaneously for all ink image pixels. However, separating the receiver from the top surface of the substrate containing the ink channels must be done in a manner which avoids smearing of the ink. Also, lifting the receiver to break ink contact rather than relying on reverse pumping of each microchannel may result in smearing and does not reliably leave the same liquid drop volume on each printed pixel.

SUMMARY OF THE INVENTION

An object of this invention is to separate a receiver from a microfluidic contact print head after ink image pixels have been printed.

A further object of this invention is to provide an apparatus for cleaning the surface of the substrate of the microfluidic contact print head.

A further object of this invention is to provide separation of the body of ink in an ink channel from that portion of ink contacting a receiver.

A further object of this invention is to clean the surface of the substrate of the microfluidic contact print head.

These objects are achieved by an apparatus for separating a receiver from a microfluidic contact print head after ink image pixels have been printed by such print head on the receiver, comprising:

(a) the print head including a plurality of ink channels for delivering ink to the receiver when the receiver is in ink transfer contact with the print head;

(b) means defining air plenums which are associated with each ink channel and a member defining an air channel for conducting air to the air plenum; and (c) means effective after the ink has been transferred from the plurality of ink channels to the receiver for causing air to be delivered from the air channel into the air plenum to exert a pressure which causes the separation of the receiver from the print head.

The present invention provides continuous tone printing of images without the necessity of using reversible pumping of ink in ink channels, while at the same time reduces the possibility of smearing of images printed on a receiver with a microfluidic contact printer during the separation of the receiver from the microfluidic contact print head.

It is additionally advantageous in accordance with the present invention that the ink in all channels can be separated from the receiver without the necessity of providing a plurality of reversible pumps.

It is a further advantage of the apparatus of the present invention that it provides cleaning of the top surface of the microfluidic contact print head substrate.

It is additionally advantageous in accordance to the present invention in that the position of the ink in the ink channels after separation of the receiver may be controlled in a predetermined manner.

DETAILED DESCRIPTION OF THE INVENTION

The present invention is described in relation to a continuous tone printer. It will be understood by those skilled in the art that the term "continuous tone images" will include not only continuous tone images recorded from nature, but also computer generated images, graphic images, line art, text images and the like.

Figure 1:
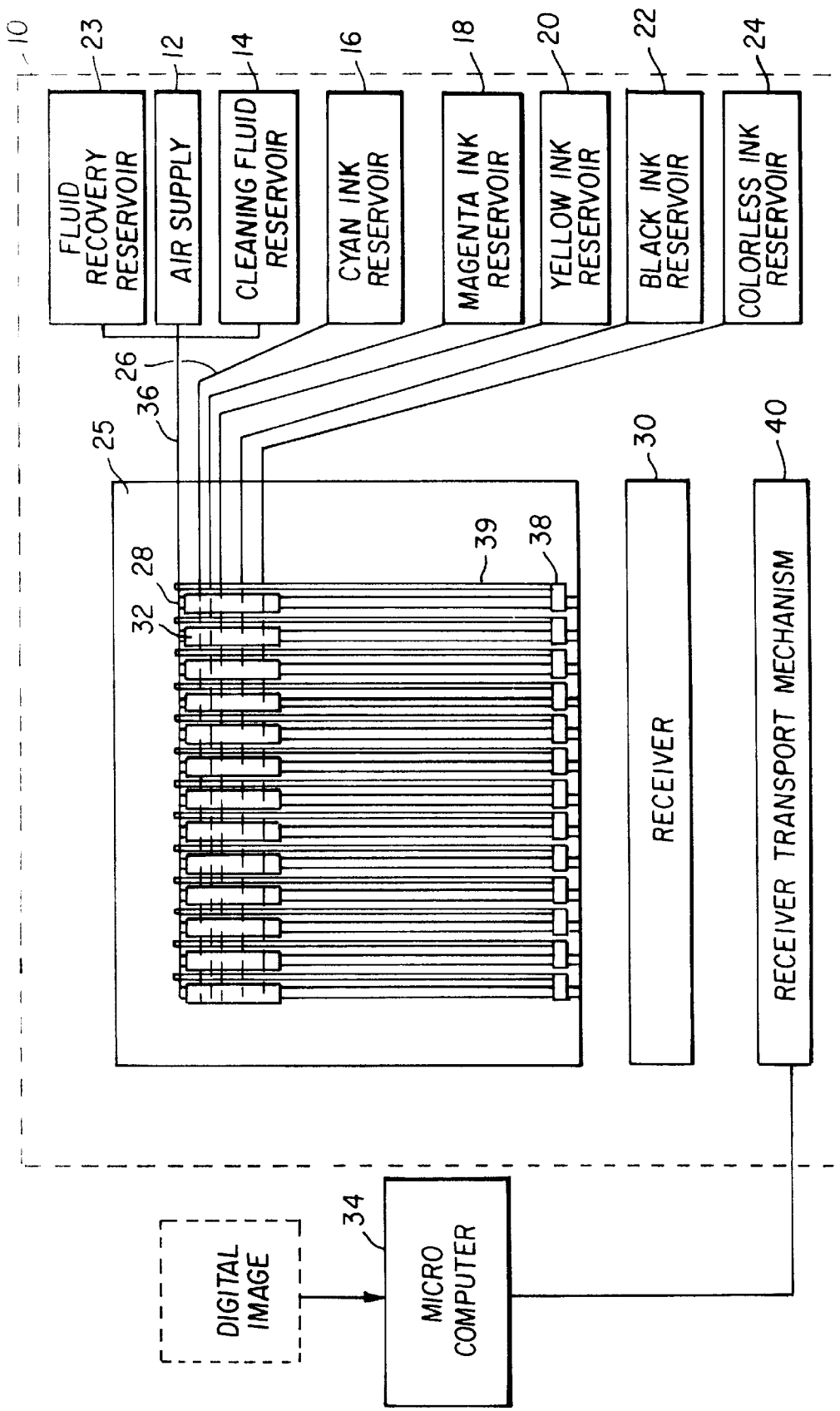
FIG. 1 is a partial schematic view showing a printing apparatus for pumping continuous tone ink image pixels onto the receiver.

Referring to FIG. 1, a schematic diagram is shown of a microfluidic printing device 10 in accordance with the present invention. Air supply device 12 provides air pressure for the printing device. Reservoirs 24, 16, 18 and 20 are respectively provided for holding colorless ink, cyan ink, magenta ink, and yellow ink. An optional reservoir 22 is shown for black ink. In addition a cleaning fluid reservoir 14 is provided for holding cleaning fluid for cleaning the system. An optional fluid recovery reservoir 23 is also provided to store the run off fluid from the cleaning process. In the microfluidic contact print head 25 microchannel capillaries 26 respectively connected to each of the reservoirs conduct ink from the corresponding reservoir to an array of ink channels 28. In the present embodiment, each ink channel is connected to a reservoir of a particular color, although it is possible to connect each ink channel to more than one reservoir and thus to mix colors of ink. In the present invention, ink channels 28 deliver the ink directly to a receiver 30. The inks are pumped along ink channels 28 by micro pumps 32 which may be activated by micro computer 34. The time of activation of each pump is controlled by a micro computer 34 according to the input digital image. Air supply device 12 is connected to an air flow network 36 which in turn is connected to a plurality of air plenums 38 via air channels 39. Air flow provided by air supply device 12 and flowing through airflow network 34 and air channels 39 to air plenums 38 assists in release of receiver 30 from microfluidic contact array print head 25. Finally, the receiver 30 is transported by a receiver transport mechanism 40 to come in contact with the microfluidic contact print head 25. Receiver 30 accepts the ink and thereby produces a hard copy print.

In operation of the device of the present invention, microcomputer 34 receives digital image information from an image source such as a digital camera or a memory device (not shown). The digital image includes a plurality of digital image pixels which represent a continuous tone color image. Microcomputer 34 is connected to micro pumps 32 and controls their operation by activating micro pumps 32 at predetermined times which depend on the image to be printed. More particularly, it causes the micro pump to be activated at such a time as to provide the correct tone scale for each image pixel. Another function of microcomputer 34 is to arrange the array of image pixels in the proper order so the image elements will be in the right sequence for viewing by the user. Microcomputer 34 includes a look-up table, which is determined experimentally, of the range of tone scales which can be achieved by the time of activation of a given micro pump. When digital image data for a particular pixel (8 bits per each of three colors ) is entered into the computer, the output from the look-up table will control the signals to micro pumps 32 to activate the pumps at the proper times. Receiver transport mechanism 40 moves receiver 30 into and out of engagement with ink channels 28 under the control of microcomputer 34. When microcomputer 34 receives the signal to print, receiver transport mechanism 40 moves a sheet of receiver material 30 into place so it is engaged with microchannels 28 and is stationary with respect to the microfluidic contact print head 25. At the end of the printing process, micro computer 34 signals air supply device 12 to release pressurized air into air channels 39 to stop the flow of ink into receiver 30 and remove it from contact with microfluidic contact printing head 25.

The colored inks used in this invention can take many forms known in the art, examples of such inks are found is U.S. Pat. No. 5,611,847 by Gustina, Santilli, and Bugner. Inks are also found in the following commonly assigned U.S. patent application Ser. No. 08/699,955 filed Aug. 20, 1996 entitled "Cyan and Magenta Pigment Set"; U.S. patent application Ser. No. 08/699,962 filed Aug. 20, 1996 entitled "Magenta Ink Jet Pigment Set"; U.S. patent application Ser. No. 08/699,963 filed Aug. 20, 1996 entitled "Cyan Ink Jet Pigment Set", all by McInerney, Oldfield, Bugner, Bermel, and Santilli; and in U.S. patent application Ser. No. 08/790, 131 filed Jan. 29, 1997 entitled "Heat Transferring Inkjet Ink Images" by Bishop, Simons, and Brick; and U. S. patent application Ser. No. 08/64,379 filed Dec. 13, 1996 entitled "Pigmented Inkjet Inks Containing Phosphated Ester Derivatives" by Martin, the disclosures of which are incorporated by reference herein. In a preferred embodiment of the invention the solvent is water. Colorants such as the Ciba Geigy Unisperse Rubine 4BA-PA, Unisperse Yellow RT-PA, and Unisperse Blue GT-PA are also preferred embodiments of the invention. The colorless ink of this invention can take a number of different forms, which will suggest themselves to those skilled in the art. If the colored inks are water soluble, then the colorless ink can be water. In that case the cleaning solution can also be water, but the cleaning solution can also be a number of solvents known in the art such as alcohol. Examples of microchannel capillaries 26, ink channels 28, and micro pumps 32 are all fully described in the references listed above.

Figure 2:
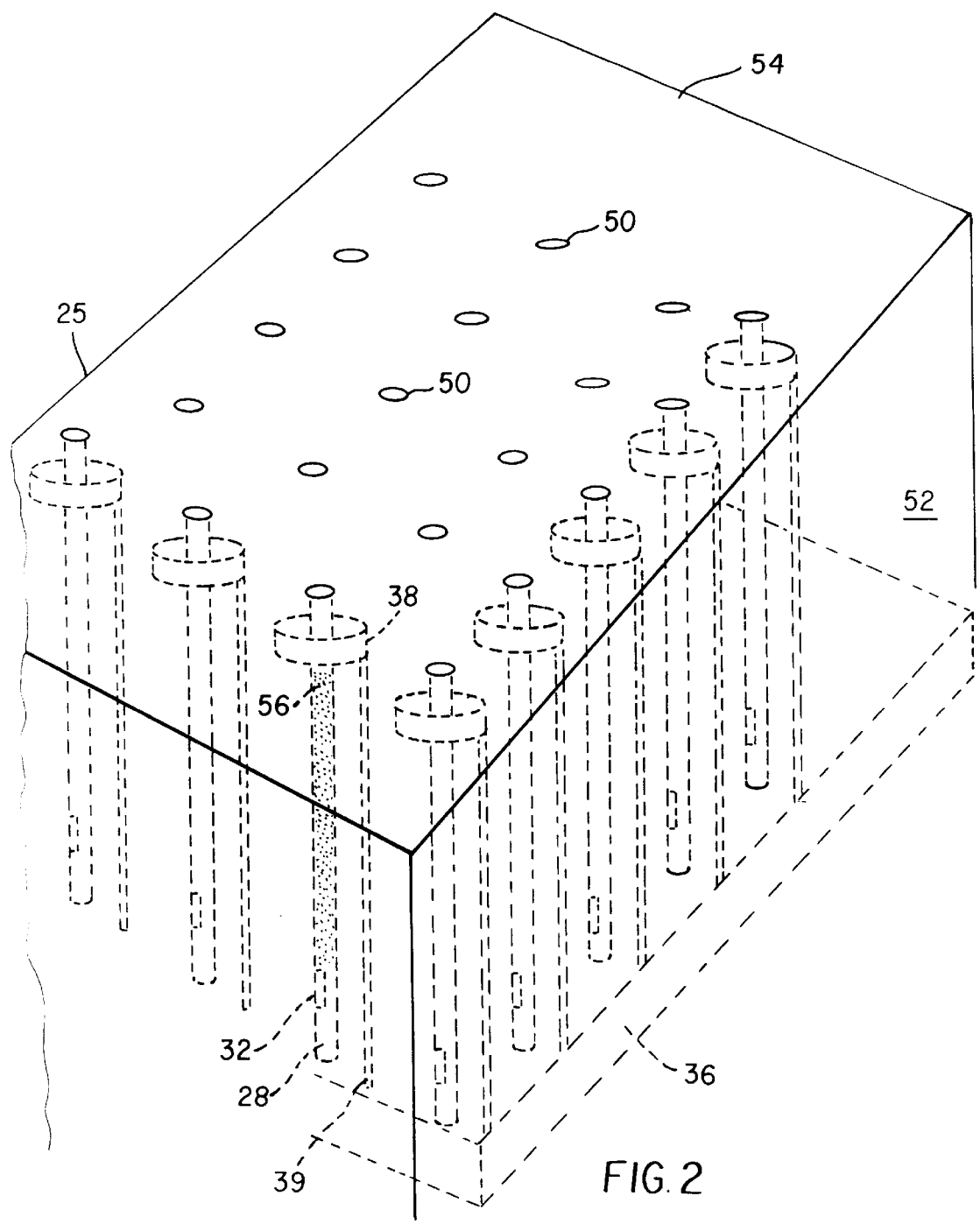
FIG. 2 is a partial schematic view showing the printer array in the present invention.

FIG. 2 shows a three-dimensional view of a two dimensional microfluidic contact print head 25 which includes ink channels 28 leading to an array of orifices 50 on a substrate 52 with a top surface 54. Each ink channel 28 contacts a reservoir of ink of a particular color, so that as ink is pumped along ink channel 28 by micro pump 32 ink is drawn from the reservoir. Typically, ink channels 28 are located in groups so that each group contains ink channels connected to reservoirs 24, 16, 18,20 and 22 of all colors, as shown in FIG. 1. Alternatively, it is possible to connect ink channels 28 to more than one reservoir to mix inks of different colors, for example in mixing chambers, which are not shown here. In addition FIG. 2 shows the air flow network 36 which feeds air into air plenums 38 via air channels 39.

A column of ink is shown in FIG. 2 in one of the ink channels 28 corresponding to a time before which printing commences. Although only one ink channel in FIG. 2 is shown filled with ink for clarity, in practice all ink channels as well as an ink reservoir, in this case 22 (FIG. 3a) are filled with ink before the time printing commences. The meniscus 56 of ink in the filled ink channel 28 shown in FIG. 2 is at this time substantially below the substrate top surface 54. This distance is typically 5 to 200 microns, in particular below air plenum 38. Most of the ink channels in FIG. 2 are shown empty in order to clearly depict the structure of a contact array print head 25. A plurality of micro pumps 32 employed during printing to move ink up and down ink channels 28 is also shown in FIG. 2. Micro pumps 32 are located in each ink channel 28 substantially below air plenum 38. For reasons of cost, contact array print head 25 is preferably made from silicon or from silicon oxide glass, so that manufacturing techniques common to the manufacture of integrated circuits can be used. Each of ink channels 28, preferably formed by plasma etching cylindrical channels in silicon substrate 52, is filled with ink to a level near the top of substrate 54. Ink to fill these channel comes from an ink reservoir (not shown, but is either or all of 16–24) which connects to the bottoms of the ink channels. Micro pumps 32 may be of the bubble expansion type, which are well known in the art. Alternatively, structures which rely on mechanical deformation of structural members such as bimetallic strips or membranes or upon piezo electric deformation of channel walls can also be used. Micro pumps 32 can be activated by integrated circuits also fabricated on substrate 52. It is advantageous in the preferred embodiment that the pump activation is accomplished by using drive voltages and currents provided from silicon integrated circuits.

Figure 3A:
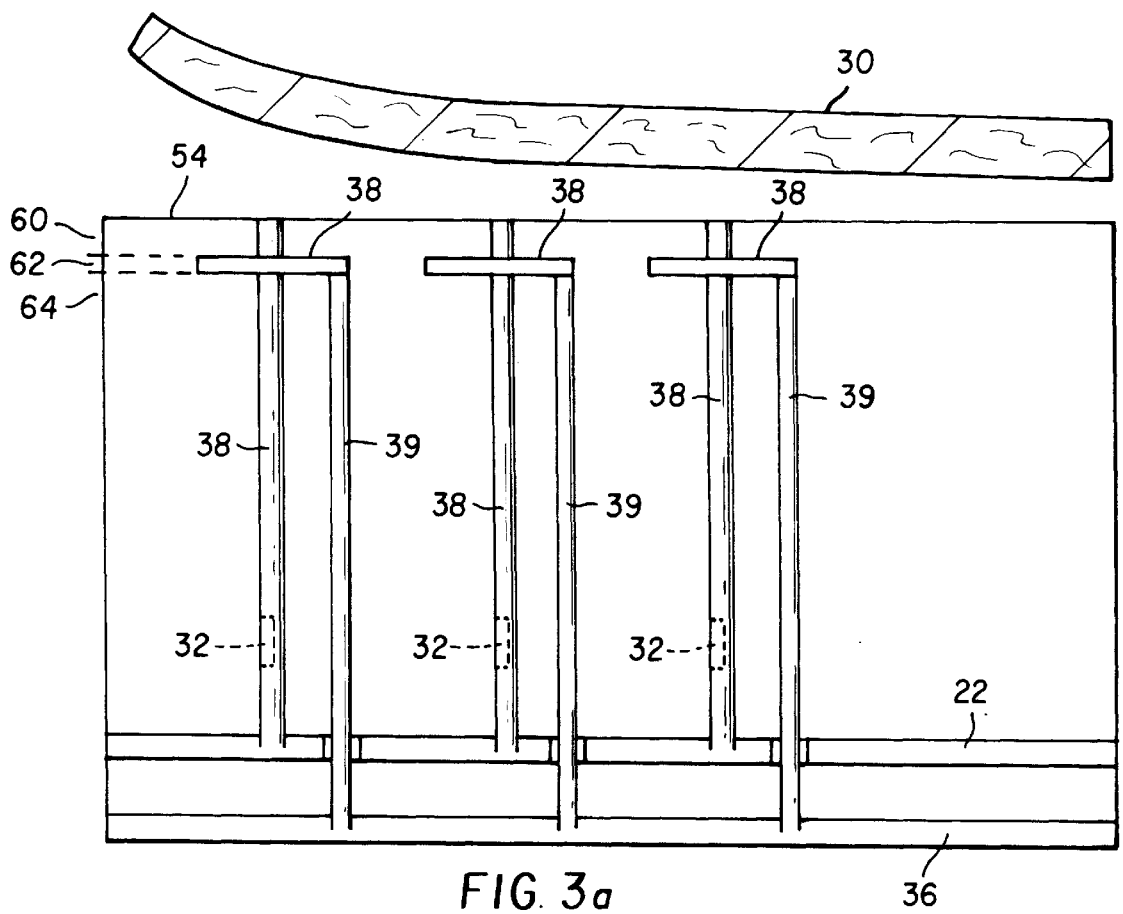
FIG. 3a is a cross-sectional view of the printer array with single air channel in the present invention.
Figure 3B:
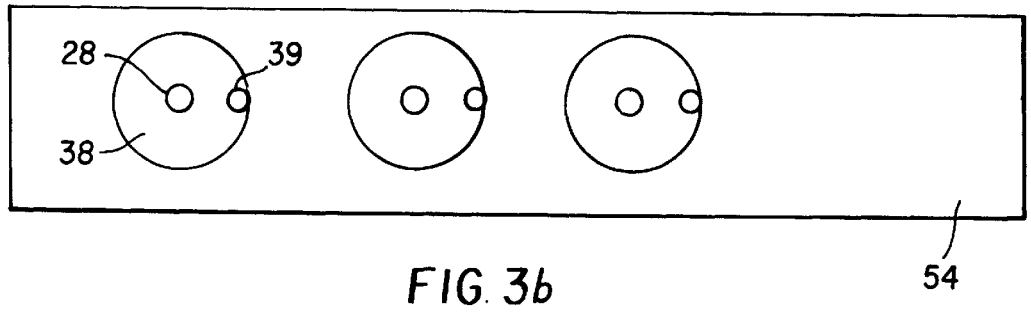
FIG. 3b is a top view of the printer array with single air channel in the present invention.
Figure 3C:
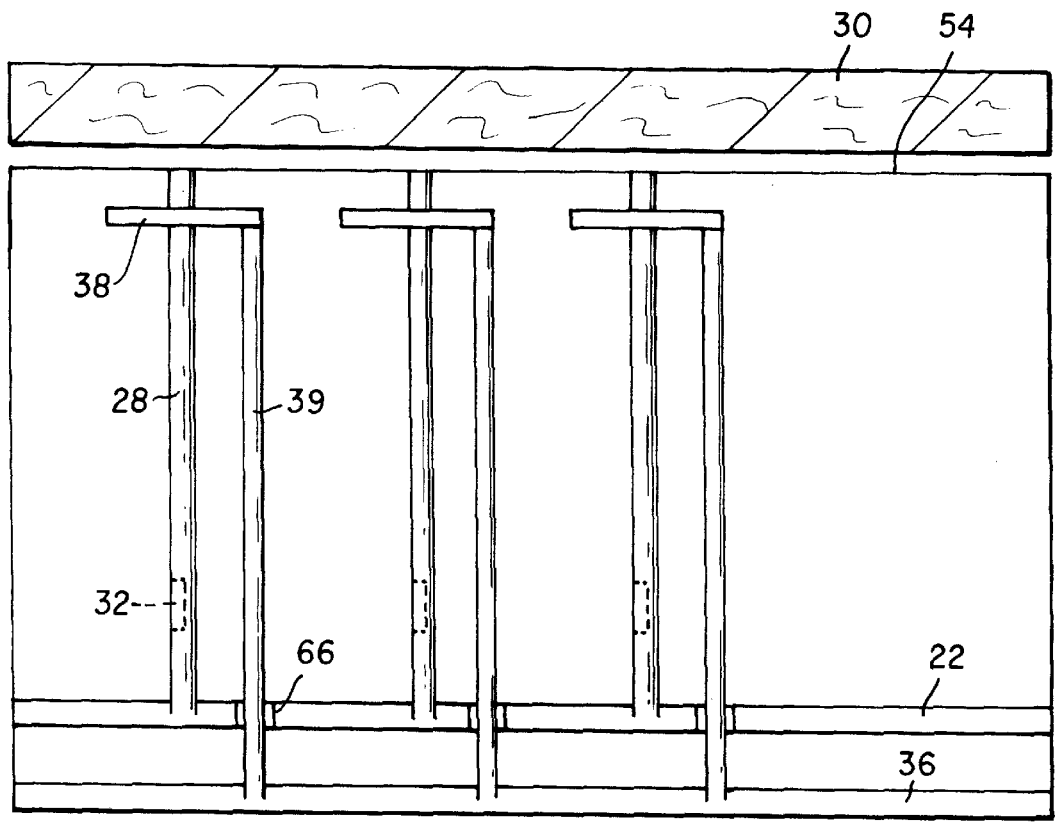
FIG. 3c is a cross-sectional view of the printer array with single air channel in the present invention.

During the printing process, receiver 30 is fixed in relation to ink channels 28, thereby forming ink image pixels on receiver 30. In accordance with the commonly assigned U.S. application Ser. No. 08/901,181, entitled "Microfluidic Printing with Optical Density Control" by Hawkins et al () the disclosure of which is incorporated herein by reference, duration of contact of ink and receiver 30 may be varied in an image-wise manner to provide grayscale image density levels at each image pixel by altering the timing of the start of the ink channel pump. In the printing process, receiver 30 shown in FIG. 3a, is brought into contact with substrate top surface 54 (FIG. 3c). Receiver 30 is preferably paper or a paper or transparent layer coated with an ink absorptive polymer, as is well known in the art of ink jet receiver materials. The receiver is capable of imbibing ink from ink channels 28 upon physical contact between the ink and the lower receiver surface of receiver 30.

In operation during the cleaning process, a sheet of receiver 30 is moved in place to contact the microfluidic contact print head 25. The cleaning fluid is then run through air channels 39 to air plenums 38 to remove dried ink and paper dust from the contact array print head 25 substrate top surface 54. The run off fluid from the cleaning process is absorbed by receiver 30, and is discarded. Receiver 30 in this case can be normal printing receiver such as paper, or a special receiver with affinity to absorb fluids. In another embodiment, the cleaning fluid is first pumped by air supply device 12, which in this case is an electric pump, through air channels 39, to clean the contact array print head 25 substrate top surface 54, and the run off fluid is then sucked back into the air channels by the reverse action of air supply device 12 and stored in fluid recovery reservoir 23.

FIG. 3a shows a cross-section of the device in FIG. 2 at a time just before the beginning of printing. A top view of substrate top surface 54 is shown in FIG. 3b which depicts the relative positions of ink channels 28, air channels 39, and air plenum 38. A receiver 30 in FIG. 3a is in the process of being positioned on substrate top surface 54. Also shown in FIG. 3a is ink reservoir 22 which connects to all ink channels. In FIG. 3c, which also illustrates a cross-section of the device in FIG. 2 at a time just before the beginning of printing, receiver 30 has been positioned in contact with the substrate top surface 54.

Figure 3D:
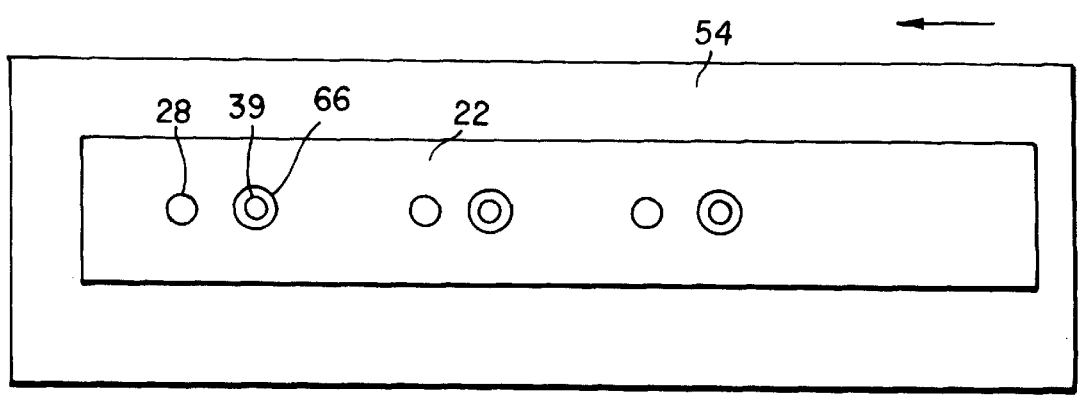
FIG. 3d is a bottom view of the printer array with single air channel in the present invention.

FIG. 3d is a top view of reservoir 22, illustrating how reservoir 22 contacts ink channels 28 but the reservoir 22 is not in contact with air channels 39. This is due to a plurality of gasket regions 60. In the fluid channels art it is known that when a plurality of channels of one type contact a reservoir of one type they will not contact channels or reservoirs of a second type. Furthermore, when a plurality of channels of the second type contact a reservoir of a second type they will not contact channels or reservoirs of the first type. In the present invention, contact of channels and reservoirs implies that fluid in one can flow to the other, while absence of contact implies that such flow is obstructed, namely by gasket regions 66.

Ink in ink channels 28 and reservoir 22 are not shown in FIGS. 3a and 3c. For clarity of illustration, however, when ink is present in the channels and reservoir just prior to printing, such ink is in a position in each ink channel 28 similar to the position of ink shown in FIG. 2. More particularly, this position is such that the top meniscus 56 of ink in all ink channels 28 is at this time is substantially below the substrate top surface 54, typically by a distance of from 5 to 200 microns. This often will be below the air plenum 38.

Figure 3E:
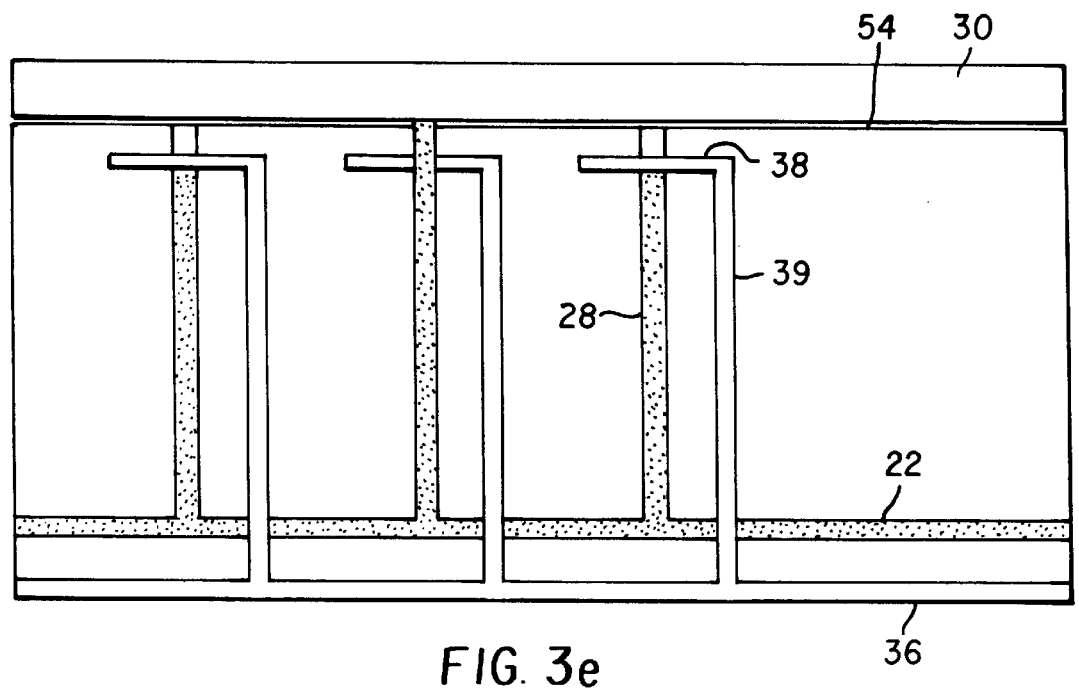
FIG. 3e is a cross-sectional view of the printer array with single air channel in the present invention during the printing process.

FIG. 3e shows the device at a time just after printing has commenced, and ink is shown in all the channels as is practiced in accordance with this invention. At this time, some of the columns of ink are shown to have been pumped along the ink channels 28 by micro pumps 32 so as to touch receiver 30 which rests on substrate top surface 54. In particular, a single channel, the center ink channel in FIG. 3e, is shown touching receiver 30. In this regard, it is preferable that the height of air plenum 38 be substantially less than the diameter of ink channel 28 in order for the ink not to flow into air plenum 38. In such a situation, the flow is prevented by the forces of surface tension as is well know in the art of fluid mechanics. Typical sizes for ink channel 28 lie in the range of from 5 microns diameter to 200 microns diameter, but are not constrained to this range, being determined primarily by the desired resolution of the printed image.

As shown in FIG. 2 and in cross-section FIG. 3e, air channels 39 are connected to air plenums 38 slightly below the substrate top surface 54. The air channels 39 and air plenums 38 may be formed in substrate 52 in many possible ways which will suggest themselves to those skilled in the art. In a particularly simple embodiment, substrate 52 includes at least three layers, as shown in FIG. 3a. In particular the top half of substrate 52 includes three layers, a top layer 60, a mid layer 62, and a bottom layer 64, mid layer 62 are formed of a different material than that of the top and bottom layers (respectively 62 and 64). The three layers can be glued together or caused to be bonded together such by heating prior to forming ink channels 28. The composition of mid layer 62 is chosen to be removable by an etch procedure such as a wet etch or an isotropic plasma etch that does not remove the material comprising top layer 60 or bottom layer 64. After forming ink channels 28, air plenums 38 are made by subjecting the entire substrate to an etching procedure which removes portions of mid layer 62, thereby forming the air plenums 38 symmetrically around ink channels 28.

Each air channel 39 is connected to the other air channels by the airflow network 36 (FIG. 3c). At the bottom of air channels 39 the air pressure in air flow network 36 is applied instantaneously to all of the air channels 39. Microfluidic contact array print head 25, in accordance with the present invention, includes air channels 39 surrounding most or all ink channels 28 and includes the air plenums 38 for delivering air to airflow network 36 in the form of an air supply device 12. The air supply device 12 can be a container of pressurized air or an electrical air pump.

During the printing process, a fraction of the plurality of pumps 32 in ink channels 28 are activated, causing the ink to be pumped into contact with receiver 30. At a certain time after the beginning of the printing process, as signaled by the micro computer 34, the printing process is terminated, for those ink channels in which ink has been caused to contact receiver 30. More particularly, this way the receiver 30 is released from substrate top surface 54 without smearing the ink. In order to accomplish this termination, operation of the microfluidic contact array print head 25 relies upon an air delivery to airflow network 36 at the time of termination.

Figure 3F:
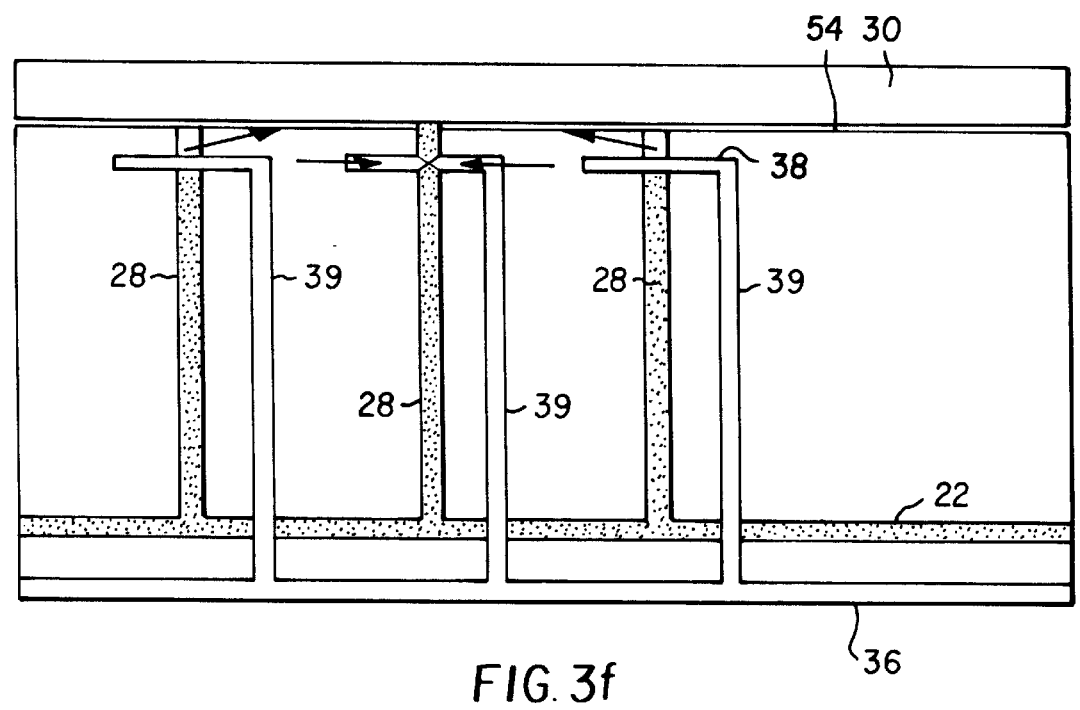
FIG. 3f is a cross-sectional view of the printer array with single air channel in the present invention during the printing process.

Air is delivered rapidly to airflow network 36 as illustrated schematically by the arrow at the base of FIG. 3f so as to cause an abrupt increase of pressure in airflow network 36 from the ambient environmental air pressure value to a value substantially above ambient pressure. For example, this increase is by an amount above ambient in the range of from 1 to 100 psi. Air delivered to the airflow network 36 flows through air channel 28 to air plenums 38. The pressure in air plenums 38 then causes separation of ink in ink channels 28 into an ink portion remaining in the channel and a receiver associated ink portion remaining in contact with receiver 30. In this way, delivery of air also causes receiver 30 to become substantially separated from substrate top surface 12 due to the upward flow of the receiver associated portion of ink and to air flow upwards in ink channel 28. This is in those ink channels whose pumps were not activated, as illustrated in FIG. 3f by the arrows in the air plenums 38 of the middle ink channel and the arrows in the top portions of the ink channels on either side. Substantial separation of receiver 30 from substrate top surface 54 are separated sufficient to preclude further contact with receiver 30 and ink in any of the plurality of ink channels 28.

Figure 3G:
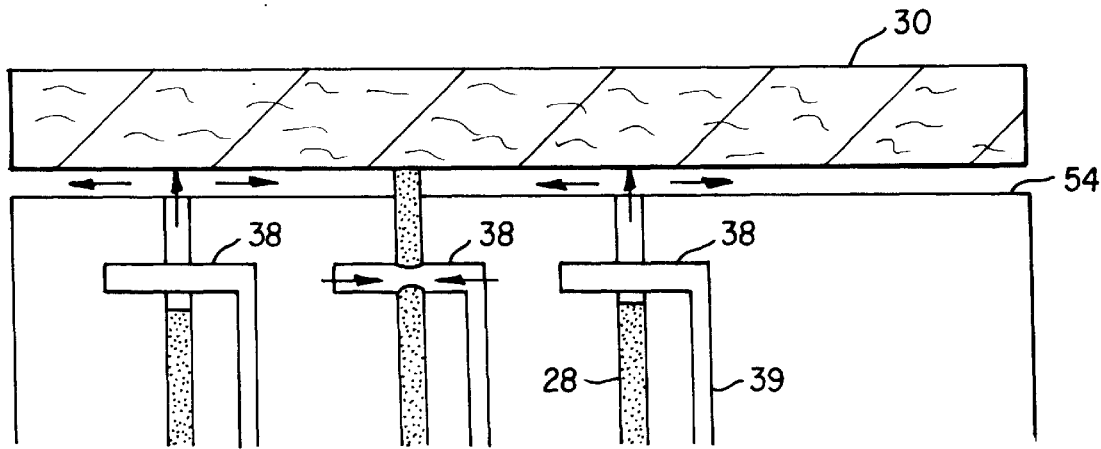
FIG. 3g is a cross-sectional view of the printer array with single air channel in the present invention at the end of the printing process.
Figure 3H:
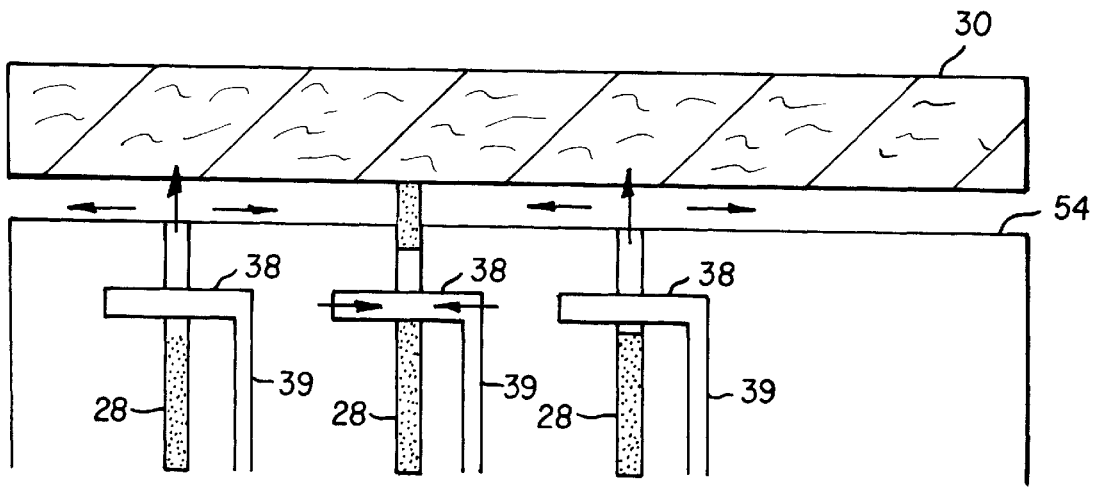
FIG. 3h is a cross-sectional view of the printer array with single air channel in the present invention at the end of the printing process.

As illustrated in FIG. 3f, air pressure in those ink channels 28 whose pumps were not activated (left and right ink channels in FIGS. 3e–3i) constrains ink in contact with the receiver 30 from spreading to regions where no image on the receiver is desired. The action of air pressure is thus designed in this embodiment to first cause a pinch off of the ink in ink channel 28 (FIG. 3c), to then cause extension of the ink above the point of pinch off (FIG. 3d) and to finally cause separation from substrate top surface 54 in a manner so as to preclude further contact with receiver 30 (FIG. 3e). In this way, the termination of contact of receiver 30 with ink from all ink channels 28, occurs simultaneously and in a manner preventing lateral smearing of ink from any ink channel, as illustrated in FIG. 3g. FIG. 3g shows the complete separation of the ink in the middle ink channel into receiver associated ink and channel ink. Similarly, in FIG. 3h, further separation has occurred and the receiver associated ink portion have been raised above the top of air plenum 38.

Figure 3I:
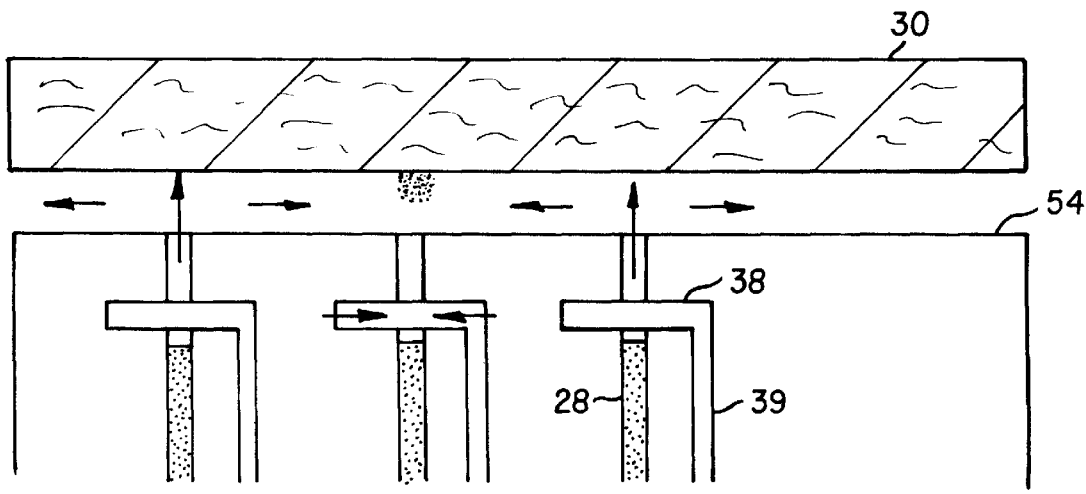
FIG. 3i is a cross-sectional view of the printer array with single air channel in the present invention at the end of the printing process.

FIG. 3i shows the final sequence of printing termination. The receiver associated ink portion is entirely separated from ink channel 28 and receiver 30 is substantially above the level of substrate top surface 54. Further printing of ink in contact with substrate 52 can no longer occur. At this time, air delivery to airflow network 36 may be stopped and receiver 30 mechanically removed, thus completing the steps of printing termination.

Figure 4A:
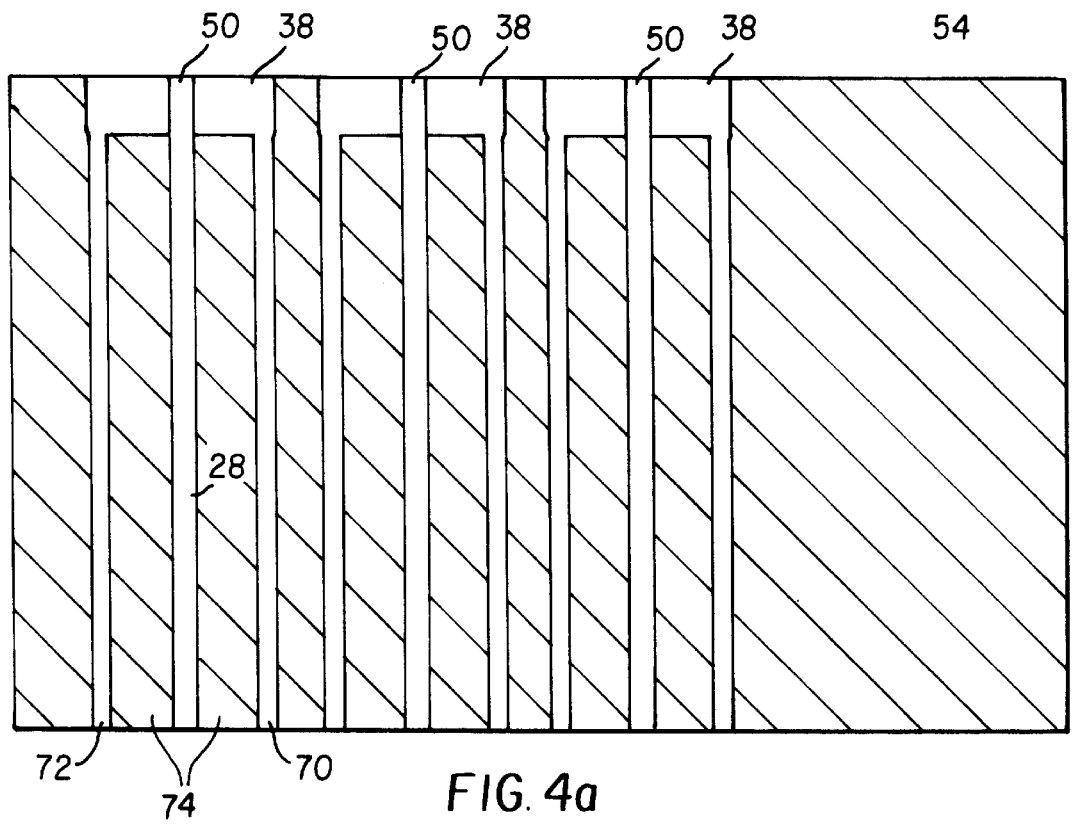
FIG. 4a is a cross-sectional view of the printer array with two air channels in the present invention.
Figure 4B:
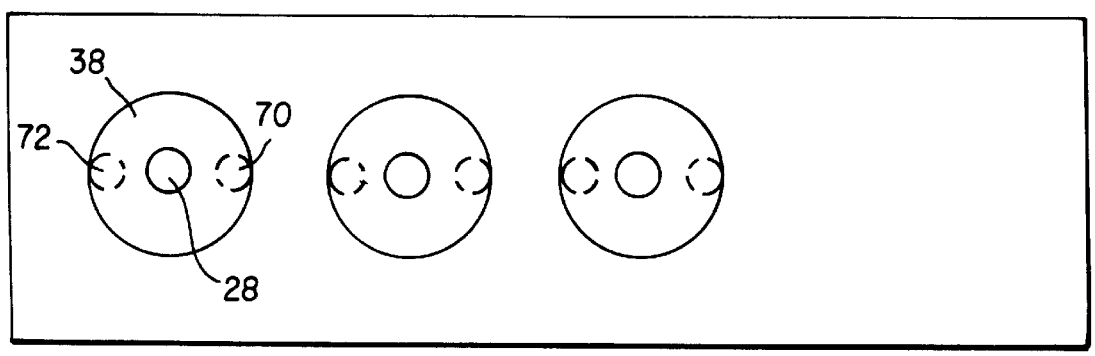
FIG. 4b is a top view of the printer array with two air channels in the present invention.

In a related embodiment of the present invention, shown in FIGS. 4a and 4b, the configuration of air plenums 38 is made so as to connect air plenums 38 directly to substrate top surface 54. In this embodiment, the depth of air plenums 38 are preferably in the range of from 2 to 20 microns in order that ink not be imbibed on receiver 30 and can be collected in air plenums 38. It is useful that at least two air channels, a first air channel 70 and a second air channel 72, are connected to each air plenums 38 rather than just one air channel, as in the previous embodiment. In this case, the bottom ends of the plurality of first air channels 70 are connected to one airflow network(not shown), and the bottom ends of the plurality of second air channels 72 are connected to another airflow network(not shown). Each of the two air flow networks are connected to air supply device 12. For purposes of clarity, the dual air flow networks are not shown in FIG. 4a. Their structure is identical to the one described and illustrated previously for the single air flow network microfluidic contact print head (See FIG. 3a). In this case, the first and second air channels, in addition to their function of flowing air from airflow networks to air plenums 38, are used to provide cleaning as well. During the cleaning process, shown in FIG. 6a, a cleaning fluid is flowed at a predetermined time into first air channel 70 and is removed through second air channel 72 by pressurizing cleaning fluid in one airflow network and applying suction to the other airflow network Cleaning fluid serves to usefully to dissolve and remove any dried ink or debris that may have accumulated in the vicinity of orifice 50 on the substrate top surface 54 (See. FIG. 4a). Top view FIG. 4b shows the relationship of ink channel 28, first and second air channels 70 and 72 respectively, and air plenums 38. The wall 74 separating ink channel 28 from air plenums 38 is preferably in the range of from 1 to 50 microns wide, in order that larger drops of ink will not be able to remain on the top surface of this wall. The function of first and second air channels (70 and 72 respectively) and air plenums 38 during termination of printing is essentially similar to the function of air channel 39 and air plenums 38 discussed with respect to FIGS. 3a–i, except that the point of separation of ink in ink channel 14, as shown for example in FIG. 3g, now occurs above substrate top surface 54.

Figure 5A:
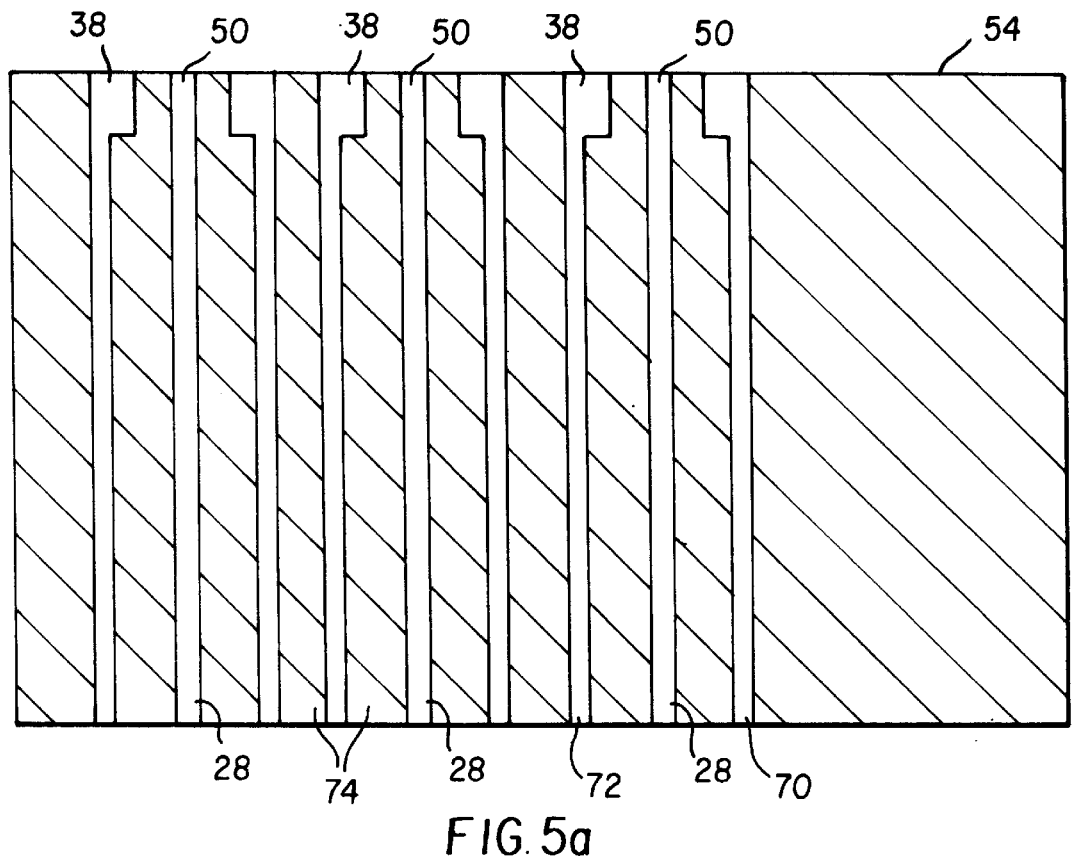
FIG. 5a is a cross-sectional view of the printer array with two air channels in the present invention.
Figure 5B:
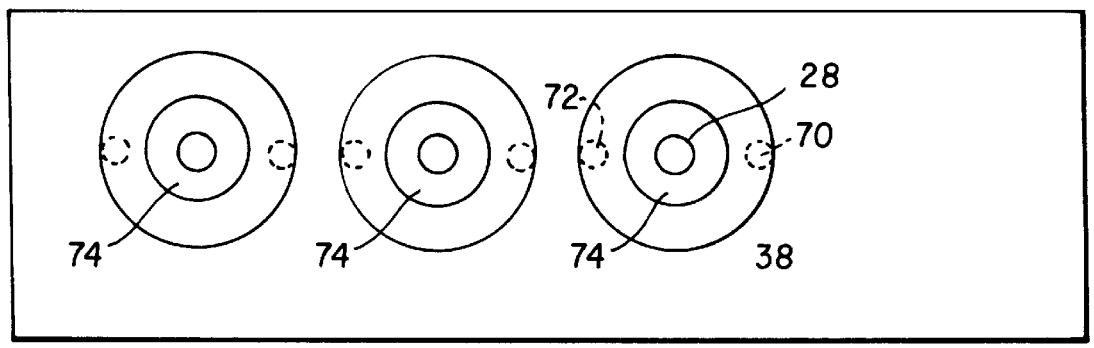
FIG. 5b is a top view of the printer array with single air channel in the present invention.

In another related embodiment of the present invention shown in FIGS. 5a and 5b, the configuration of air plenums 38 is such as to connect the top of air plenums 38 directly to substrate top surface 54, as in FIGS. 4a and 4b. However, in this arrangement the air plenums 38 are substantially removed from ink channels 28, preferable by a distance of more than about 50 microns. First air channel 70 and second air channel 72, are connected to each air plenum 38. In this embodiment, the depth of air plenums 38 is typically 10 to 200 microns in order to distribute air flow to the immediate region of receiver 30 near the air plenums 38. During termination of printing, the air applied to the air plenums 38 primarily acts to push the receiver rapidly upwards. Top view FIG. 5b shows the relationship of ink channel 28, first and second air channels 70 and 72 respectively, and air plenums 38.

Figure 6A:
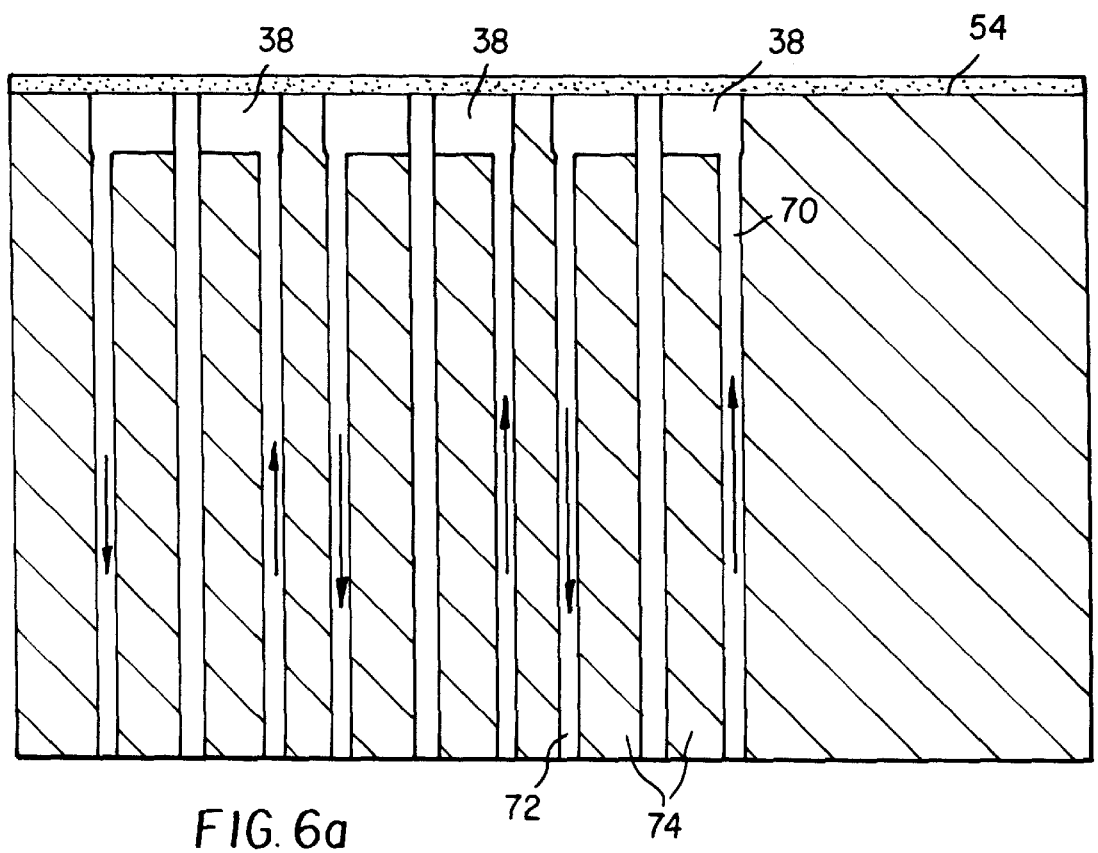
FIG. 6a is a cross-sectional view of the printer array with two air channels during the cleaning process of the present invention.
Figure 6B:
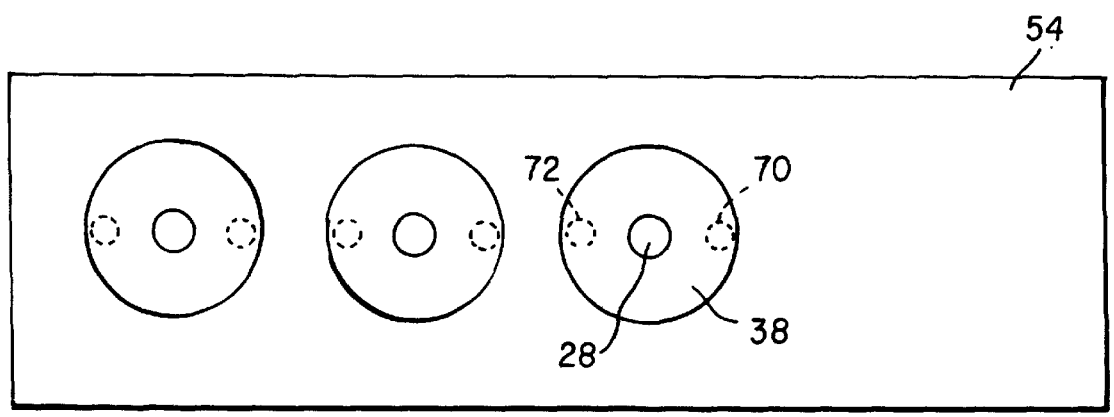
FIG. 6b is a top view of the printer array with two air channels during the cleaning process of the present invention.

FIG. 6a shows a related embodiment of the present invention during a cleaning process. Cleaning fluid is pumped through air channel 70 to air plenums 38, and subsequently to substrate top surface 54. The fluid, having removed ink residues from substrate top surface is sucked back through air channel 72. FIG. 6a shows the cleaning fluid present on substrate top surface 54. FIG. 6b shows the relationship of ink channels 28, first ink channel 70, second ink channel 72, and air plenums 38 during the cleaning process with cleaning fluid on substrate top surface 54.

The invention has been described in detail with particular reference to certain preferred embodiments thereof, but it will be understood that variations and modifications can be effected within the spirit and scope of the invention.

PARTS LIST 10 microfluidic printing device
12 air supply device
14 colorless ink reservoir
16 cyan ink reservoir
18 magenta ink reservoir
20 yellow ink reservoir
22 black ink reservoir
23 fluid recovery reservoir
24 cleaning fluid reservoir
25 microfluidic contact print head
26 microchannel capillaries
28 ink channels
30 receiver
32 micro pumps
34 micro computer
36 air flow network
38 air plenums
39 air channel
40 receiver transport mechanism
50 orifices
52 substrate
54 substrate top surface
56 meniscus
60 substrate top layer
62 substrate middle layer
64 substrate bottom layer
66 gasket region
70 first air channel
72 second air channel
74 wall separating air flow channel from ink channel

What is claimed is:

1. Cleaning apparatus for a micro-fluidic printing device which separates a receiver from a print head after ink image pixels have been printed by the print head on the receiver, comprising:

(a) the print head including a substrate and a plurality of ink channels for delivering ink through the substrate to the receiver when the receiver is in ink transfer contact with the substrate surface;

(b) means including an air supply device and defining air plenum which are associated with each ink channel and means defining an air channel for conducting air to the air plenum;

(c) means effective after the ink has been transferred from the plurality of ink channels to the receiver for causing air to be delivered from the air supply device to the air channel and into the air plenum to exert a pressure which causes the separation of the receiver from the print head; and (d) means for delivering cleaning fluid through the air channels to the air plenum and through the ink channels to clean the surface of the substrate.

2. Cleaning apparatus for a micro-fluidic printing device which separates a receiver from a print head after ink image pixels have been printed by the print head on the receiver, comprising:

(a) the print head including a substrate and defining a plurality of ink channels for delivering ink through the substrate to the receiver when the receiver is in ink transfer contact with the substrate surface;

(b) means defining air plenums which are associated with each ink channel;

(c) first and second air channels associated with each air plenum;

(d) means effective after the ink has been transferred for causing cleaning fluid to be delivered through the first air channel to the air plenum and through the air channels to clean the surface of the substrate; and (e) means defining a cleaning fluid reservoir and for causing cleaning fluid to be removed from the substrate surface through the second air channel.

* * * * *